(12) United States Patent
Zhan et al.

(10) Patent No.: US 11,473,820 B2
(45) Date of Patent: Oct. 18, 2022

(54) AIR CONDITIONING SYSTEM AND ELECTRONIC EXPANSION VALVE THEREOF

(71) Applicant: ZHEJIANG DUNAN ARTIFICIAL ENVIRONMENT CO., LTD., Shaoxing (CN)

(72) Inventors: Shaojun Zhan, Shaoxing (CN); Qiubo He, Shaoxing (CN); Guigang Feng, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 0 days.

(21) Appl. No.: 17/059,243

(22) PCT Filed: Aug. 2, 2019

(86) PCT No.: PCT/CN2019/099044
§ 371 (c)(1),
(2) Date: Nov. 26, 2020

(87) PCT Pub. No.: WO2020/025048
PCT Pub. Date: Feb. 6, 2020

(65) Prior Publication Data
US 2021/0190399 A1 Jun. 24, 2021

(30) Foreign Application Priority Data
Aug. 2, 2018 (CN) .......................... 201821242025.2

(51) Int. Cl.
*F25B 41/35* (2021.01)
*F16K 1/38* (2006.01)
(Continued)

(52) U.S. Cl.
CPC ................ *F25B 41/35* (2021.01); *F16K 1/38* (2013.01); *F16K 1/422* (2013.01); *F16K 27/102* (2013.01);
(Continued)

(58) Field of Classification Search
CPC ... F16K 1/38; F16K 1/422; F16K 1/26; F16K 1/42; F16K 27/102; F16K 27/02;
(Continued)

(56) References Cited

U.S. PATENT DOCUMENTS 7,165,755 B2 * 1/2007 Umezawa ............... F25B 41/31
251/129.11
7,871,059 B2 * 1/2011 Nalini ................... F16K 31/047
251/129.11
(Continued)

FOREIGN PATENT DOCUMENTS

CN 102878730 A 1/2013
CN 202914861 U 5/2013
(Continued)

OTHER PUBLICATIONS

Machine translation of CN 102878730; accessed Dec. 14, 2021 (Year: 2013).*
(Continued)

*Primary Examiner* — Craig J Price
*Assistant Examiner* — Andrew J Rost

(57) ABSTRACT

An electronic expansion valve comprises: a valve body, the valve body comprising a main body section, an extension section, and a step section, wherein a valve seat core being in a tubular shape and having openings at two ends, wherein the valve seat core comprises a tubular body and a limiting step formed at one end of the tubular body, the tubular body penetrates through the extension section, the limiting step abuts against the inner wall of the step section, and one end
(Continued)

of the tubular body away from the limiting step extends out of the extension section; and an air outlet pipe, which is sleeved in the extension section and abuts against an outer wall of the step section, a groove is defined by an inner wall of the air outlet pipe, the extension section, and an outer wall of the tubular body in a surrounding mode.

11 Claims, 3 Drawing Sheets

(51) Int. Cl.
    *F16K 1/42*     (2006.01)
    *F16K 27/10*     (2006.01)
    *F16K 31/04*     (2006.01)
    *F16K 31/50*     (2006.01)

(52) U.S. Cl.
    CPC .......... *F16K 31/047* (2013.01); *F16K 31/504* (2013.01); *F25B 2341/06* (2013.01)

(58) Field of Classification Search
    CPC ...... F16K 27/10; F16K 31/047; F16K 31/504; F25B 41/35; F25B 41/34; F25B 2341/06; Y02B 30/70
    USPC ........................................................ 251/362
    See application file for complete search history.

(56) References Cited

U.S. PATENT DOCUMENTS

| | | | | |
|---|---|---|---|---|
| 8,157,184 B2* | 4/2012 | Hayashi | ................. | F25B 41/31 236/92 B |
| 8,556,229 B2* | 10/2013 | Lv | ............ | F25B 41/31 251/129.11 |
| 9,541,315 B2* | 1/2017 | Zhan | ....................... | F25B 41/31 |
| 9,689,595 B2* | 6/2017 | Zhan | ....................... | F25B 41/31 |
| 9,726,406 B2* | 8/2017 | Sekiguchi | ............... | F25B 41/22 |
| 9,822,894 B2* | 11/2017 | Bayyouk | ................. | F04B 53/10 |
| 2010/0000244 A1* | 1/2010 | Kawakatsu | ............. | F25B 41/31 62/210 |
| 2011/0084224 A1* | 4/2011 | Zhan | ....................... | F25B 41/31 251/129.01 |
| 2012/0091375 A1* | 4/2012 | Suganuma | ................ | F16K 1/52 251/129.01 |
| 2013/0306176 A1* | 11/2013 | Harada | ..................... | F16K 1/52 137/624.27 |
| 2016/0290525 A1* | 10/2016 | Hotta | ...................... | F25B 41/31 |

FOREIGN PATENT DOCUMENTS

| | | |
|---|---|---|
| CN | 102878730 B | 7/2014 |
| JP | 2001241562 A | 9/2001 |

OTHER PUBLICATIONS

International Search Report of PCT/CN2019/099044.
The extended European search report of 19845177.5, dated Jul. 9, 2021.

* cited by examiner

AIR CONDITIONING SYSTEM AND ELECTRONIC EXPANSION VALVE THEREOF

CROSS-REFERENCE TO RELATED APPLICATIONS

This application is a 371 of international PCT patent application PCT/CN2019/099044 filed on Aug. 2, 2019, which claims all benefits accruing under 35 U.S.C. § 119 from China Patent Application No. 201821242025.2, filed on Aug. 2, 2018, in the China National Intellectual Property Administration, the contents of which are hereby incorporated by reference.

TECHNICAL FIELD

The present disclosure relates to the field of air conditioning refrigeration, and in particular, to an air conditioning system and an electronic expansion valve thereof.

BACKGROUND

An air conditioning system generally includes a condenser, an evaporator and an electronic expansion valve. The electronic expansion valve can be used to throttle and depressurize the high-pressure liquid refrigerant from the condenser, and adjust and control the flow of the liquid refrigerant entering the evaporator.

The electronic expansion valve can include a valve body having a valve seat core, a valve needle and a welding ring inside thereof. The valve needle can penetrate through the valve seat core, and move up and down in order to control a size of an opening of the valve seat core, so as to control a flow rate of the refrigerant. The welding ring can be used for connecting the valve seat core and the valve body, so as to fix them together.

However, the structure of the conventional valve seat core is complicated, it is difficult to install and weld the welding ring, which can result in a poor weld. Therefore, the valve seat core may not be firmly fixed to the valve body, and the reliability low.

SUMMARY

In order to solve the problem of the conventional electronic expansion valve with low reliability, an air conditioning system having high reliability and an electronic expansion valve thereof are provided.

An embodiment of the present disclosure includes an electronic expansion valve including:

a valve body having a tubular shape, wherein the valve body comprises a main body section, an extension section and a step section connecting the main body section and the extension section, and an inner diameter of the main body section is greater than an inner diameter of the extension section;

a valve seat core having a tubular shape and having openings at two ends, wherein the valve seat core includes a tubular body and a limiting step formed at one end of the tubular body, the limiting step abuts against an inner wall of the step section, the tubular body penetrates through the extension section, and one end of the tubular body away from the limiting step extends out of the extension section; and an air outlet pipe, which is sleeved in the extension section and abuts against an outer wall of the step section, and a groove defined by an inner wall of the air outlet pipe, the extension section, and an outer wall of the tubular body in a surrounding mode and configured for accommodating a welding ring.

In some embodiments, the limiting step can have an annular shape, and a surface of the limiting step towards the tubular body can abut against the inner wall of the step section.

In some embodiments, the tubular body can include a middle portion and an edge portion, the middle portion can be located between the limiting step and the edge portion, and the middle portion can form an interference fit with the extension section.

In some embodiments, a length of the middle portion can be less than a length of the extension section, and an outer diameter of the middle portion can be greater than an outer diameter of the edge portion, so that a gap having an annular shape can be defined between an inner wall of the extension section and an outer wall of the edge portion, and the gap can communicate with the groove.

In some embodiments, the air outlet pipe can form an interference fit with the extension section.

In some embodiments, the electronic expansion valve can further include a valve needle. A first end of the valve needle near the valve seat core can fit with an opening of the valve seat core. The first end of the valve needle can be a cone structure. A diameter of the cone structure gradually decreases along a direction from the limiting step to the tubular body.

In some embodiments, the electronic expansion valve can further include a rotor, a screw and a nut base accommodated in the main body section. The nut base can be fixed to an inner wall of the valve body and threadedly connected to the screw. The rotor can be sleeved on the nut base and fixedly connected to one end of the screw, and the other end of the screw away from the rotor can be connected with the valve needle in a transmission way. The rotor can be rotatable about an axis of the screw, so as to drive the screw and the valve needle to slide.

In some embodiments, the electronic expansion valve can further include a sleeve accommodated and fixed in the main body section of the valve body. The other end of the screw away from the rotor and a second end of the valve needle away from the valve seat core are accommodated and slidable in the sleeve.

In some embodiments, the electronic expansion valve can further include an elastic member. A cylindrical lug boss can be defined in a middle portion of the screw along a radial direction of the screw. The valve needle can have a hollow structure, and an inner wall of the valve needle forms an annular protrusion along a radial direction of the valve needle. The elastic member can sheath outside the screw, and both ends of the elastic member abut against the surfaces of the annular protrusion and the cylindrical lug boss, respectively. The screw can be slidably penetrated through the annular protrusion, the other end of the screw away from the rotor is provided with a convex structure, and an outer diameter of the convex structure is greater than an inner diameter of the annular protrusion.

In some embodiments, protruding directions of the annular protrusion, the cylindrical lug boss, and the convex structure are perpendicular to an axial direction of the valve body.

In some embodiments, the nut seat can include a threaded portion and a seat portion. The threaded portion can be arranged close to the rotor. An inside of the threaded portion can communicate with an inside of the seat portion. The screw can penetrate through the threaded portion and be threadedly connected to the threaded portion.

In some embodiments, an inner diameter of the seat portion can gradually increase along a direction from the threaded portion to the seat portion.

In some embodiments, the electronic expansion valve can further include an air inlet pipe, and the air inlet pipe can be connected to the main body section.

The present disclosure further provides,
an air conditioning system including:
a condenser;
an evaporator; and
the electronic expansion valve, wherein the evaporator communicates with one end of the air outlet pipe away from the valve body, and the condenser communicates with the main body section via a pipe.

The air conditioning system and the electronic expansion valve thereof have the following advantages.

The valve seat core includes the tubular body and the limiting step, and the limiting step abuts against the inner wall of the step section of the valve body, so that the valve seat core and the valve body can be substantially fixed together. Furthermore, one end of the tubular body away from the limiting step protrudes out of the extension section, and the groove can be defined by the inner wall of the air outlet pipe, the extension section, and an outer wall of the tubular body in the surrounding mode and configured for accommodating the welding ring. Therefore, during a welding process, the welding ring can be stably located in the groove, and welding liquid formed by the welding ring will fix the air outlet pipe, the valve seat core and the valve body together. Compared with the conventional valve seat core, the structure of the valve seat core of the electronic expansion valve and the mounting and welding operations of the welding ring are simple, and the welding effect is good. Moreover, the air outlet pipe can be fixed to the valve body while the valve body and the valve seat core are fixed together, thereby having high reliability.

In the figure, 100 represents an electronic expansion valve, 110 represents a valve body, 111 represents a main body section, 112 represents a step section, 113 represents an extension section, 114 represents a welding ring, 120 represents a valve seat core, 121 represents a limiting step, 122 represents a tubular body, 1221 represents a middle portion, 1222 represents an edge portion, 123 represents a gap, 124 represents a groove, 130 represents an air outlet pipe, 131 represents an air inlet pipe, 140 represents a valve needle, 141 represents a cone structure, 142 represents an annular protrusion, 150 represents a rotor, 160 represents a screw, 161 represents a cylindrical lug boss, 162 represents a convex structure, 170 represents a nut base, 171 represents a threaded portion, 172 represents a seat portion, 180 represents a sleeve, and 190 represents an elastic member.

DETAILED DESCRIPTION

Hereinafter, the technical solutions in the embodiments of the present disclosure will be clearly and completely described with reference to the accompanying drawings in the embodiments of the present disclosure. Obviously, the described embodiments are merely a part of the embodiments of the present disclosure, rather than all of the embodiments. Based on the embodiments of the present disclosure, all other embodiments obtained by one skilled in the art without creative efforts all belong to the scope of protection of the present disclosure.

It should be noted that when an element is referred to as being "fixed" to another element, it may be directly attached to the other element or a further element may be presented between them. When an element is considered to be "connected" to another element, it may be directly connected to the other element or connected to the other element through a further element (e.g., indirectly connected).

Unless otherwise defined, all technical and scientific terms used herein have the same meaning as one skilled in the art would understand. The terminology used in the description of the present disclosure is for the purpose of describing particular embodiments and is not intended to limit the disclosure. As used herein, the term "or/and" includes any and all combinations of one or more related listed items.

Figure 1:
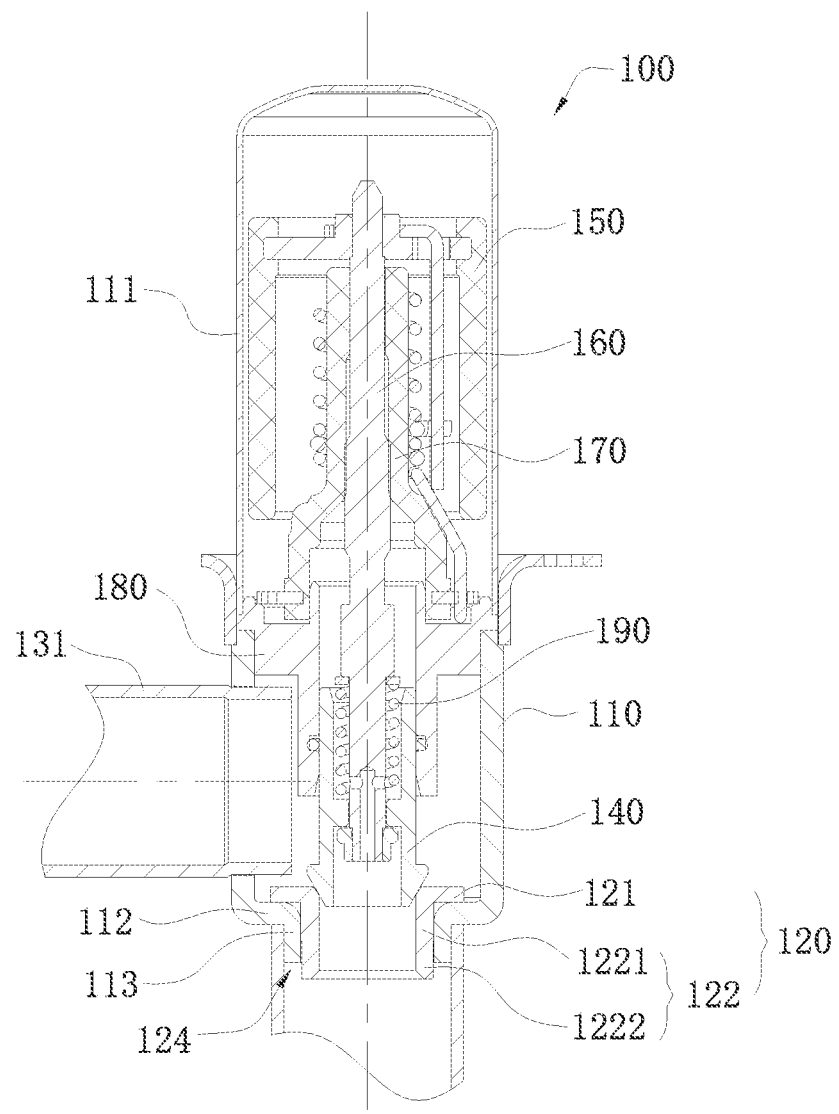
FIG. 1 is a sectional view of an electronic expansion valve of the present disclosure.

Referring to FIG. 1, one embodiment of the present disclosure provides an air conditioning system (not shown). The air conditioning system can include a condenser (not shown), an evaporator (not shown), and an electronic expansion valve 100. The electronic expansion valve 100 can be connected to the condenser and the evaporator, respectively.

The condenser of the air conditioning system can be a heat exchanger and generally installed outdoors. When the air conditioner system is in a process of refrigeration, the condenser can be used to exchange heat with the outside air, and change the liquid refrigerant with high temperature and high pressure into the liquid refrigerant with medium temperature and high pressure. The evaporator of the air conditioning system can be a heat exchanger and generally arranged indoor.

Both the condenser and the evaporator communicate with the electronic expansion valve 100 via a pipe. Specifically, the electronic expansion valve 100 can control a size of the opening of a valve seat core of the electronic expansion valve 100 in order to control a flow rate of a liquid refrigerant from the condenser into the evaporator, and to throttle and depressurize the liquid refrigerant with a medium temperature and high pressure heat after being exchanged with the air, thereby achieving the effect of adjusting the indoor temperature.

Of course, except for the condenser, the evaporator and the electronic expansion valve 100, the air conditioning system can further include other members such as a compressor, so as to cooperate with such above components to complete the process of refrigeration or heating of the air conditioning system.

Figure 2:
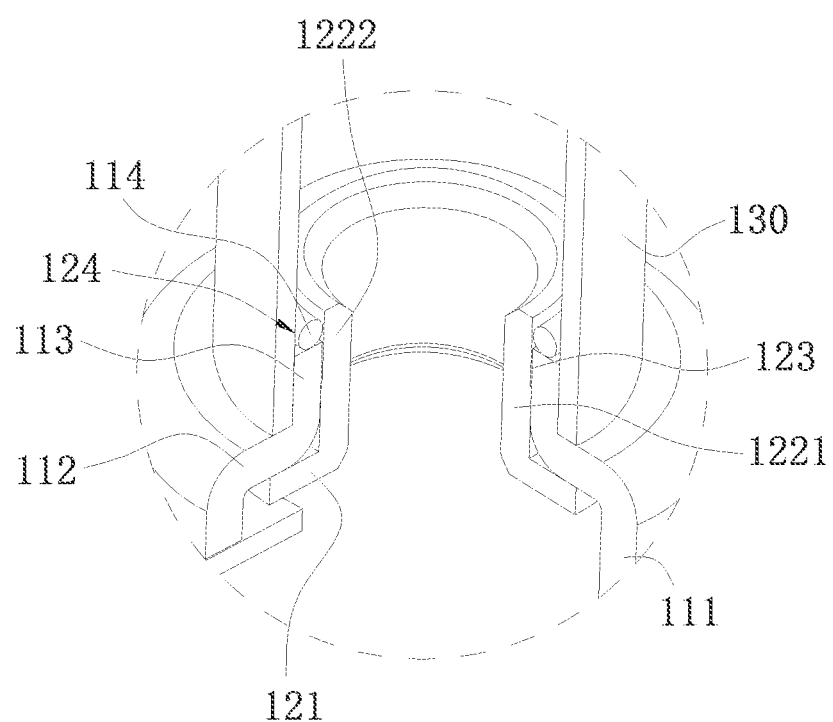
FIG. 2 is a partial enlarged view of a valve seat core contacting with a valve body of an electronic expansion valve of the present disclosure.
Figure 3:
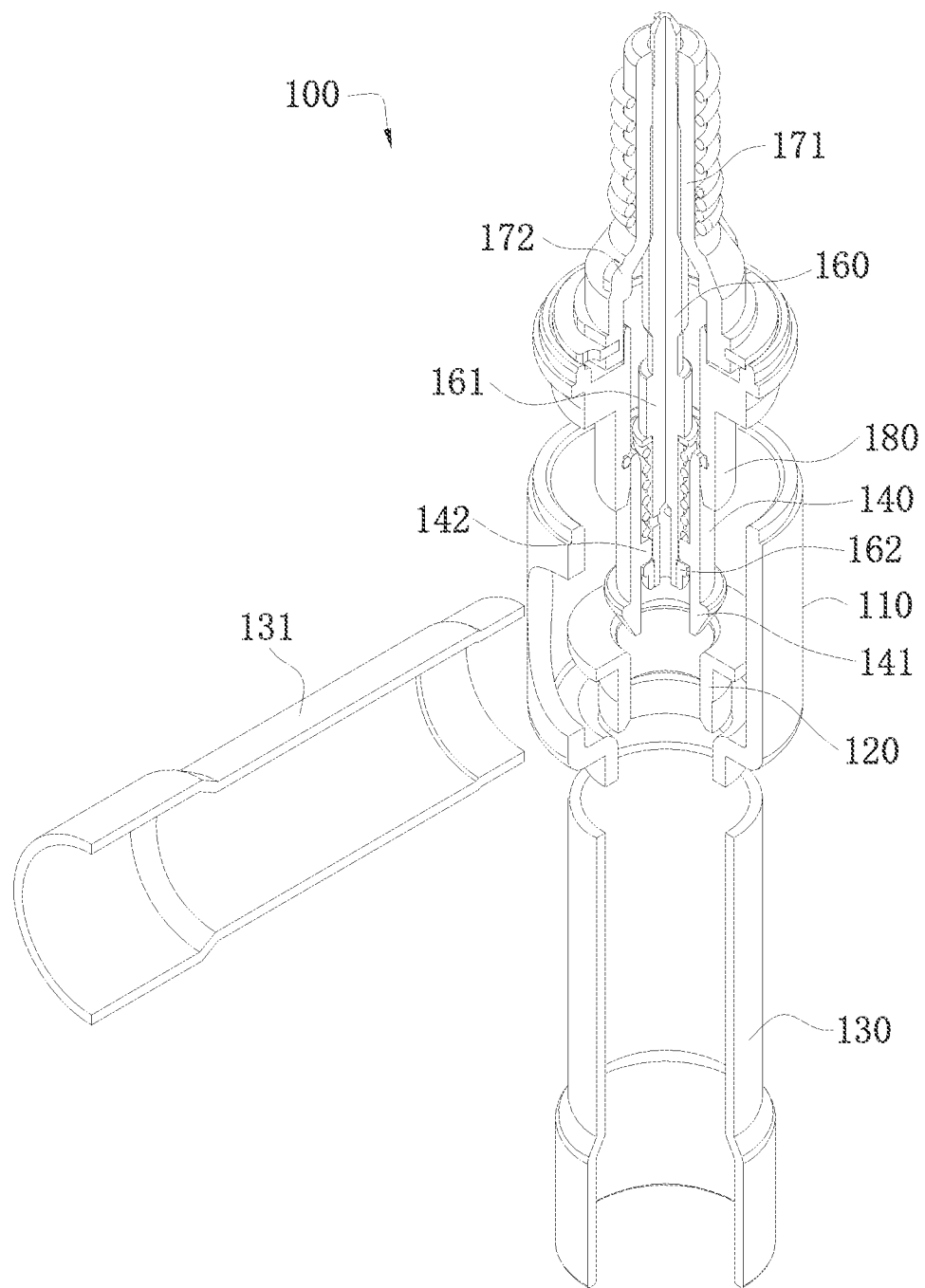
FIG. 3 is a perspective view of an electronic expansion valve of the present disclosure.

Referring to FIGS. 2 and 3, the electronic expansion valve 100 in a preferred embodiment of the present disclosure can include a valve body 110 and a valve seat core 120. The valve seat core 120 is located in the valve body 110.

The valve body 110 can have a tubular shape. Specifically, the valve body 110 can be in the shape of a cylindrical tube, a square tube, a frame tube, and so on. In this embodiment, the valve body 110 is in a shape of a cylindrical tube. It can be understood that the valve body 110 in the shape of a cylindrical tube will be simple to manufacture, and the cost will be low. Furthermore, since both the condenser and the evaporator communicate with the electronic expansion valve 100 via the pipe, the valve body 110 in the shape of a cylindrical tube makes it convenient to mount the pipe on the electronic expansion valve 100, achieving the sealing connection between the pipe and the electronic expansion valve 100. In another embodiment, the valve body 110 is disposed in the air conditioning system and the valve body 110 also needs to have a better mechanical strength property due to a great change of temperature, so that the valve body 110 can be made of a metal material.

The valve body 110 includes a main body section 111, a step section 112, and an extension section 113. The step section 112 connects main body section 111 with extension section 113. An inner diameter of the main body section 111 is greater than an inner diameter of the extension section 113.

The main body section 111 is configured for accommodating main elements of the valve body 110, and therefore, the main body section 111 can have a large space. In the air conditioning system, the evaporator communicates with the main body section 111 through a pipe.

The step section 112 can be mainly configured for connecting the main body section 111 and the extension section 113. The extension section 113 can be configured for fixing the pipe.

The valve seat core 120 can have a tubular shape and have openings at two ends. Both the valve seat core 120 and the valve body 110 have the tubular shape, achieving a better accommodating and fixing effect. Since the valve seat core 120 is disposed in the air conditioning system, the valve seat core 120 can be made of a metal material, resulting in having better mechanical strength.

The valve seat core 120 can include a tubular body 122 and a limiting step 121 formed at one end of the tubular body 122. The tubular body 122 penetrates through the extension section 113. The limiting step 121 abuts against an inner wall of the step section 112, and one end of the tubular body 122 away from the limiting step 121 protrudes out of the extension section 113. It can be understood that, the extension section 113 can include a through hole (not shown) configured for accommodating/mounting the tubular body 122, and one end of the tubular body 122 extends out of the through hole. An opening of the valve seat core 120 near the limiting step 121 is defined as a valve port, and a flow rate of the refrigerant can be adjusted and sealed by opening and closing of the valve port and by controlling the size of the opening.

In detail, the limiting step 121 may have a stepped shape including a plurality of bending portions. Alternatively, the limiting step 121 may be annular-shaped, and formed directly at the edge of the opening of the tubular body 122. In this embodiment, the limiting step 121 has an annular shape, and a surface of the limiting step 121 toward the tubular body 122 abuts against the inner wall of the step section 112.

The annular-shaped limiting step 121 is simple in molding, and the manufacturing cost is low. Due to the annular limiting step 121, the valve seat core 120 can be fixed to the valve body 110, so that the electronic expansion valve 100 has a simpler structure, which facilitates miniaturization of the electronic expansion valve 100.

The air outlet pipe 130 is sleeved in the extension section 113 and abuts against an outer wall of the step section 112. A groove 124 can be defined by an inner wall of the outlet pipe 130, the extension section 113, and the outer wall of the tubular body 122 in a surrounding mode and configured for accommodating a welding ring. It can be understood that, the tubular body 122 extends out of the through hole. That is, the outer wall of the tubular body 122, the end of the extension section 113 and the inner wall of the outlet pipe 130 surround and form the groove 124.

In the air conditioning system, the evaporator communicates with one end of the air outlet pipe 130 away from the valve body 110. In addition, the electronic expansion valve further includes an air inlet pipe 131, and the condenser communicates with the main body section 111 through the air inlet pipe 131.

The welding ring 114 can be disposed in the groove 124. During a welding process, welding liquid melted by the welding ring 114 can be solidified to make the valve body 110, the valve seat core 120 and the air outlet pipe 130 fix together, thereby achieving fixed connection of the gas pipe 130, the valve body 110 and the valve seat core 120. Therefore, due to the groove 124, the air outlet pipe 130, the valve body 110 and the valve seat core 120 can be fixed/integrated, thereby shortening the manufacturing time and improving the working efficiency of the electronic expansion valve 100.

When the air conditioning system is in operation, the refrigerant enters the valve body 110 from the air inlet pipe 131. After being throttled by the valve port, the refrigerant flows into the outlet pipe 130 from the valve body 110 until it flows into the evaporator.

Furthermore, in this embodiment, the air outlet pipe 130 may form an interference fit with the extension section 113. As a result, the inner wall of the air outlet pipe 130 can closely attach the outer wall of the extension section 113. Even if the electronic expansion valve 100 shakes during operation, the air outlet pipe 130 can be firmly fixed to the extension section 130, so that the electronic expansion valve 100 works normally. In order to achieve a better fixing effect, the air outlet pipe 130 is welded on the outer wall of the extension section 113.

In this embodiment, the tubular body 122 can include a middle portion 1221 and an edge portion 1222. The middle portion 1221 is located between the limiting step 121 and the edge portion 1222, and the middle portion 1221 forms an interference fit with the extension section 113. The edge portion 1222 is located outside the through hole, and the groove 124 can be define by the edge portion 1222, the extension section 113 and the air outlet pipe 130.

By creating an interference fit between the middle portion 1221 and the extension section 113, the valve seat core 120 can be firmly fixed to the valve body 110. It can effectively prevent the valve seat core 120 from falling off from the valve body 110 due to shaking during operation. Furthermore, this interference fit manner can also avoid redundant fasteners, so that the electronic expansion valve 100 can have a lighter weight, which facilitates the lightening of the electronic expansion valve 100.

Furthermore, in the present embodiment, the length of the middle portion 1221 is less than the length of the extension section 113. An outer diameter of the middle portion 1221 is greater than an outer diameter of the edge portion 1222 such that a gap 123 is formed between the inner wall of the extension section 113 and the outer wall of the edge portion 1222.

In a welding process, the welding liquid melted by the welding ring 114 will enter the gap 123 and be solidified in the gap 123. The gap 123 will effectively increase a contact area between the valve seat core 120 and the valve body 110, so as to achieve a better fixing effect, and higher reliability.

In this embodiment, the electronic expansion valve 100 can further include a valve needle 140. A first end of the valve needle 140 near the valve seat core 120 can cooperate with an opening (i.e., the valve port) of the limiting step 121, so as to control the opening size of the valve port. The first end of the valve needle 140 near the valve seat core 120 can have a cone structure 141, and its diameter gradually decreases along the direction from the limiting step 121 to the tubular body 122.

The cone structure 141 can slide along an axial direction of the valve body 110, and the opening size of the valve port can be controlled, and the flow rate of the refrigerant passing can be controlled, thereby controlling the indoor temperature.

In this embodiment, the electronic expansion valve 100 can further include a rotor 150, a screw 160, and a nut base 170 accommodated in the main body section 111. The nut base 170 can be fixed to an inner wall of the valve body 110 and threadedly connected to the screw 160. The rotor 150 can be sleeved on the nut base 170 and fixedly connected to one end of the screw 160. The other end of the screw 160 away from the rotor 150 is connected with the valve needle 140 in a transmission way. When the rotor 150 rotates, the screw 160 will be driven to move, resulting in the valve needle 140 moves, so as to control the opening, closing or the opening size of the valve port.

The rotor 150 can drive the screw 160 to rotate, and a circumferential movement of the rotor 150 can be converted into a linear movement of the screw 160. The screw 160 can drive the valve needle 140 to move in the axial direction of the valve body 110, so as to control states of the valve port (wherein the states of the valve port includes an totally opening state, a closing state or a size of opening). Due to the rotor 150, the nut base 170 and the screw 160, the circumferential movement can be converted into the linear movement, and the volume of the valve body 110 can be effectively reduced, thereby facilitating the miniaturization of the electronic expansion valve 100.

In this embodiment, the nut base 170 can include a threaded portion 171 and a seat portion 172. An inside of the threaded portion 171 communicates with an inside of the seat portion 172. In detail, the threaded portion 171 has a tubular shape and extends along the axial direction of the valve body 110. The screw 160 penetrates through the threaded portion 171 and is threadedly connected to the threaded portion 171. The threaded portion 171 can be configured for guiding and limiting the screw 160, such as the screw 160 being limited to move along the longitudinal direction of the valve body 110. The rotor 150 can be sleeved on the threaded portion 171. The seat portion 172 can be disposed at one end of the threaded portion 171 away from the rotor 150. An opening communicating with the nut base 170 is provided at one end of the seat portion 172 away from the threaded portion 171. An inner diameter of the seat portion 172 gradually increases along a direction from the threaded portion 171 to the seat portion 172, so as to provide a sufficient space to connect the screw 160 with the valve needle 140.

Generally, in order to realize the rotation of the rotor 150, a coil can be provided outside the valve body 110. After the coil is powered on, a magnetic field can be generated and the rotor 150 can be driven to rotate.

Furthermore, in this embodiment, the electronic expansion valve 100 can further include a sleeve 180 accommodated in and fixed to the main body section 111. One end of the screw 160 away from the rotor 150 and a second end of the valve needle 140 away from the valve seat core 120 can be slidably accommodated in the sleeve 180.

In detail, one end of the sleeve 180 can be held on the seat portion 172 of the nut base 170, and a sidewall of the sleeve 180 can be fixed to the valve body 110 by a fastener. The sleeve 180 can extend along the axil direction of the valve needle 140. The sleeve 180 can be configured for guiding and limiting the sliding movement of the screw 160 and the valve needle 140. Meanwhile, the sleeve 180 can prevent the valve needle 140 from swinging during sliding, to improve the movement accuracy of the valve needle 140.

In this embodiment, the electronic expansion valve 100 further includes an elastic member 190. A cylindrical lug boss 161 is defined in a middle portion of the screw 160 along a radial direction of the screw 160. The valve needle 140 can have a hollow structure. An inner wall of the valve needle (140) can form an annular protrusion 142 along a radial direction of the valve needle 140. The elastic member 190 sheathes outside the screw 160. Both ends of the elastic member 190 abut against the surfaces of the annular protrusion 142 and the cylindrical lug boss 161, respectively. The screw 160 is slidably penetrated through the annular protrusion 142. The other end of the screw 160 away from the rotor 150 can be provided with a convex structure. An outer diameter of the convex structure is greater than an inner diameter of the annular protrusion 142.

In detail, the cylindrical lug boss 161 is located in the sleeve 180 and outside the valve needle 140. The convex structure 162 is accommodated in the valve needle 140. The convex structure 162 and the cylindrical protrusion 161 are respectively located on opposite sides of the annular protrusion 142. When the electronic expansion valve 100 is in operation, the screw 160 moves in a direction toward the valve seat core 120, and the cylindrical lug boss 161 presses the elastic member 190, and the elastic member 190 will be compressed. The elastic member 190 can provide an elastic restoring force for the annular protrusion 142 toward the valve seat core 120, and can drive the valve needle 140 to move in a direction toward the valve seat core 120, so that the opening size of the valve port of the limiting step 121 can be reduced, and the flow rate of the refrigerant into the valve body 110 is increased. When the opening size of the valve port of the limiting step 121 needs to be increased, the screw 160 drives the convex structure 162 to move in the direction away from the valve seat core 120, and the convex structure 162 presses the annular protrusion 142 of the valve needle 140, and then drives the valve needle 140 to move in the direction away from the valve seat core 120, so as to adjust the opening size of the valve port.

It can be understood that, due to the elastic member 190, the cylindrical lug boss 161, the annular protrusion 142 and the convex structure 162, the transmission mode of the screw 160 and the valve needle 140 can be simplified, and the working efficiency is improved. The screw 160 and the valve needle 140 can be effectively prevented from swinging during the sliding process due to the layer by layer structure of the nut base 170, the sleeve 180, the valve needle 140 and the screw 160, thereby achieving better operation accuracy.

Furthermore, in this embodiment, the elastic member 190 can be a spring sleeved on the screw 160. It can be understood that, the spring is sleeved on the screw 160, so that the installation of the elastic member 190 is simple and easy, and the working efficiency can be improved. Moreover, the screw 160 can also support the spring to prevent the spring from swinging during movement, resulting in improving the operation accuracy of the electronic expansion valve 100.

In this embodiment, protruding directions of the annular protrusion 142, the cylindrical lug boss 161, and the convex structure 162 are perpendicular to an axial direction of the valve body 110.

Therefore, during the operation of the screw 160 and the valve needle 140, the spring contacts a large contact area of the annular protrusion 142, and the convex structure 162 contacts a large contact area of the annular protrusion 142, to effectively prevent the screw 160 and the valve needle 140 from being excessively pressed during operation and the valve needle 140 fail to move. Furthermore, the screw 160 and the valve needle 140 have better transmission performance.

In the electronic expansion valve 100, the valve seat core 120 includes the tubular body 122 and the limiting step 121, and the limiting step 121 abuts against the inner wall of the step section 112 of the valve body 110, so that the valve seat core 120 and the valve body 110 can be substantially fixed together. Furthermore, one end of the tubular body 122 away from the limiting step 121 protrudes out of the extension section 113, and the groove 124 can be defined by the inner wall of the air outlet pipe 130, the extension section 113, and an outer wall of the tubular body 122 in the surrounding mode and configured for accommodating the welding ring 114. Therefore, during a welding process, the welding ring 114 can be stably located in the groove 124, and welding liquid formed by the welding ring 114 will make the air outlet pipe 130, the valve seat core 120 and the valve body 110 fix together. Compared with the conventional valve seat core, the structure of the valve seat core 120 of the electronic expansion valve 100 is simple, and the mounting and welding operations of the welding ring 14 are simple, and the welding effect is great. Moreover, the air outlet pipe 130 can be fixed to the valve body 110 while the valve body 110 and the valve seat core 120 are fixed together, thereby having high reliability.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. An electronic expansion valve, comprising:
   a valve body having a tubular shape, wherein the valve body comprises a main body section, an extension section and a step section connecting the main body section and the extension section, and an inner diameter of the main body section is greater than an inner diameter of the extension section;
   a valve seat core having a tubular shape and having openings at two ends, wherein the valve seat core comprises a tubular body and a limiting step formed at one end of the tubular body, the tubular body penetrates through the extension section, the limiting step abuts against an inner wall of the step section and one end of the tubular body away from the limiting step extends out of the extension section; and
   an air outlet pipe, which is sleeved in the extension section and abuts against an outer wall of the step section, and a groove is defined by an inner wall of the air outlet pipe, the extension section, and an outer wall of the tubular body in a surrounding mode and configured for accommodating a welding ring;
   the tubular body comprises a middle portion and an edge portion, the middle portion is located between the limiting step and the edge portion, and the middle portion forms an interference fit with the extension section; and
   a length of the middle portion is less than a length of the extension section, and an outer diameter of the middle portion is greater than an outer diameter of the edge portion, so that a gap having an annular shape is defined between an inner wall of the extension section and an outer wall of the edge portion, and the gap communicates with the groove.

2. The electronic expansion valve of claim 1, wherein the limiting step has an annular shape, and a surface of the limiting step towards the tubular body abuts against the inner wall of the step section.

3. The electronic expansion valve of claim 1, wherein the air outlet pipe forms an interference fit with the extension section.

4. The electronic expansion valve of claim 1, further comprising a valve needle, wherein a first end of the valve needle near the valve seat core fits with an opening of the valve seat core, the first end of the valve needle has a cone structure, and a diameter of the cone structure gradually decreases along a direction from the limiting step to the tubular body.

5. The electronic expansion valve of claim 4, further comprising a rotor, a screw and a nut base accommodated in the main body section, the nut base is fixed to an inner wall of the valve body and threadedly connected to the screw, the rotor is sleeved on the nut base and fixedly connected to one end of the screw, and the other end of the screw away from the rotor is connected with the valve needle in a transmission way, the rotor is rotatable about an axis of the screw, so as to drive the screw and the valve needle to slide.

6. The electronic expansion valve of claim 5, further comprising a sleeve accommodated and fixed in the main body section of the valve body, wherein the other end of the screw away from the rotor and a second end of the valve needle away from the valve seat core are accommodated and slidable in the sleeve.

7. The electronic expansion valve of claim 5, further comprising an elastic member, wherein a cylindrical lug boss is defined in a middle portion of the screw along a radial direction of the screw, the valve needle has a hollow structure, and an inner wall of the valve needle forms an annular protrusion along a radial direction of the valve needle, the elastic member sheathes outside the screw, and both ends of the elastic member abut against the surfaces of the annular protrusion and the cylindrical lug boss, respectively, the screw is slidably penetrated through the annular protrusion, the other end of the screw away from the rotor is provided with a convex structure, an outer diameter of the convex structure is greater than an inner diameter of the annular protrusion.

8. The electronic expansion valve of claim 7, wherein protruding directions of the annular protrusion, the cylindrical lug boss, and the convex structure are perpendicular to an axial direction of the valve body.

9. The electronic expansion valve of claim 5, wherein the nut base comprises a threaded portion and a seat portion, the threaded portion is arranged close to the rotor, an inside of the threaded portion communicates with an inside of the seat portion, the screw penetrates through the threaded portion and is threadedly connected to the threaded portion.

10. The electronic expansion valve of claim 9, wherein an inner diameter of the seat portion gradually increases along a direction from the threaded portion to the seat portion.

11. The electronic expansion valve of claim 1, further comprising an air inlet pipe connected to the main body section.

* * * * *